United States Patent [19]
Holroyd et al.

[11] Patent Number: 5,201,975
[45] Date of Patent: Apr. 13, 1993

[54] TIRE MANUFACTURE

[75] Inventors: Colin Holroyd, Southport; Anthony G. Goodfellow, Liverpool, both of England

[73] Assignee: Bridgestone/Firestone Inc., Akron, Ohio

[21] Appl. No.: 737,581

[22] Filed: Jul. 25, 1991

Related U.S. Application Data

[63] Continuation of Ser. No. 474,130, May 1, 1990, filed as PCT/GB88/00986, Nov. 14, 1988, abandoned.

Foreign Application Priority Data

[30]

Nov. 13, 1987 [GB] United Kingdom ................ 8726629

[51] Int. Cl.$^5$ ........................................... B29C 30/18
[52] U.S. Cl. .................................... 156/124; 156/127; 156/129; 156/131; 264/326; 264/DIG. 59; 425/32; 425/46; 425/47
[58] Field of Search ......... 264/36, 315, 326, DIG. 59; 425/20, 42, 32, 46, 47; 156/97, 127, 128.1, 123, 129, 128.6, 124, 131

[56] References Cited

U.S. PATENT DOCUMENTS

| | | | |
|---|---|---|---|
| 2,014,010 | 9/1935 | Wheatley | 264/36 |
| 2,840,857 | 7/1958 | Lett | 425/20 |
| 3,713,929 | 1/1973 | Bottaso et al. | 425/42 |
| 3,983,193 | 9/1976 | Walker et al. | 156/96 |
| 4,738,738 | 4/1988 | Holroyd et al. | 264/326 |
| 4,921,673 | 5/1990 | Holroyd et al. | 264/326 |

FOREIGN PATENT DOCUMENTS 1592854 7/1981 United Kingdom .

Primary Examiner—Jeffery Thurlow
Assistant Examiner—Mathieu Vargot
Attorney, Agent, or Firm—Sughrue, Mion, Zinn, Macpeak & Seas

[57] ABSTRACT

A tire is manufactured by assembling a tread package into a pattern ring and molding a tread thereon while partially precuring the package. The tire is further assembled by positioning an uncured carcass within the pattern ring so that the carcass contacts an uncured portion of the tread package. Finally, the assembled tire is separated from the pattern ring and subsequently heated in a mold devoid of a tread pattern to bond and cure the complete tire.

10 Claims, 2 Drawing Sheets

TIRE MANUFACTURE

This is a continuation of application Ser. No. 07/474,130 filed May 1, 1990, filed as PCT/GB88/00986, Nov. 14, 1988, now abandoned.

BACKGROUND OF THE INVENTION

Conventional methods of tire manufacture comprise assembling a "green cover" from a plurality of unvulcanised rubber components, placing the green cover into a mould and applying heat and pressure so that the final shape, particularly the tread pattern, is imparted to the covers and the rubber cured, so that a complete tire is formed. The stages of moulding and curing the tire are expensive because a large, steam heated press working on a heating cycle of about 15 minutes, for a size of tire suitable for a car, is required. The press is conventionally designed to accommodate two tire moulds so two tires are produced simultaneously but the moulds themselves are expensive particularly because they each comprise a large number, e.g. up to 64, tread moulding segments mounted in a backing ring. Each individual segment is made from die-cast aluminium alloy and machined to a complex shape so is therefore expensive. The other parts of the mould for shaping the tire sidewalls, etc. are also expensive.

Not only are the moulds expensive but they are only capable of being used to form one size of tire. For example it is not possible to allow a range of tyres with different tread widths to be formed in the same mould.

It is an object of the present invention to attempt to overcome or alleviate these disadvantages.

SUMMARY OF THE INVENTION

In accordance with the present invention a method of manufacturing a tire comprises assembling an annular tread package which includes uncured rubber into a pattern ring to impart a pattern to the tread rubber, heating the tread rubber to become partially cured, positioning the remaining components of the tire within the annular tread package to assemble a complete tire, the positioning taking place either before or after the tread rubber is heated, separating the pattern ring from the tread rubber, placing the assembled tire within a mould which contains no means to impart a pattern to the tread rubber and heating the mould completely to cure the tire.

The tread package may comprise tread rubber, subtread (or under-tread) rubber, a breaker comprising one or more layers of rubberised cord fabric, a breaker cushion and filler strips. Not all these components may be present depending on the type of tire being manufactured.

The tread package may be assembled on a mandrel before being assembled into the pattern ring.

The pattern ring may be heated to cause at least partial curing of the tread rubber, and depending on the temperature and length of time for which the ring is heated, to cause at least partial curing of the remaining rubber in the package a veneer of rubber on the radially inner side of the package is preferably partially or wholly uncured so as to facilitate adhesion to be remaining parts of the tire, particularly the tire carcass, during subsequent assembly.

The pattern ring preferably comprises a plurality of segments which may be moved radially inward or outward in a controlled manner, in particular outward movement causing the separation of the ring from the tread rubber at the appropriate stage of tire manufacture.

The mould is preferably capable of being adapted to cure, one at a time, tires of different thread widths.

BRIEF DESCRIPTION OF THE DRAWINGS

Two embodiments of the invention will now be described by way of example with reference to the accompanying drawings, in which.

DETAILED DESCRIPTION

Figure 1:
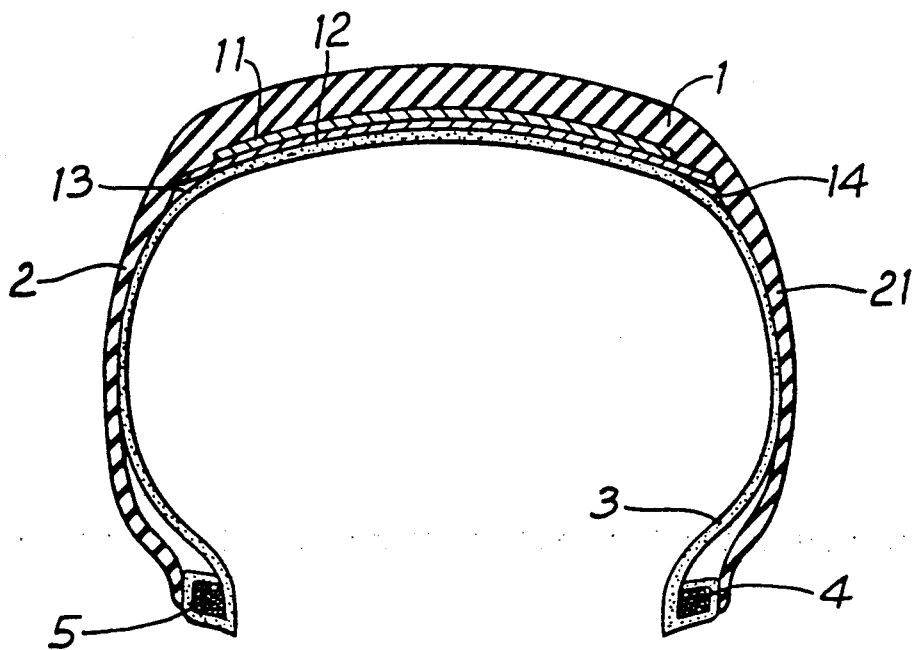
FIG. 1 is a cross-section through a conventional tire to be manufactured by the method according to the invention.

The tire shown in FIG. 1 comprises a tread package of tread and under-tread rubber 1, two breaker layer 11, 12 each of rubberised cord fabric and rubber filler strips 13, 14, a carcass comprising a carcass ply 3 extending between and being anchored around two bead cores 4 and 5 in conventional manner and two sidewalls 2, 21 each comprising a layer of rubber.

Figure 2:
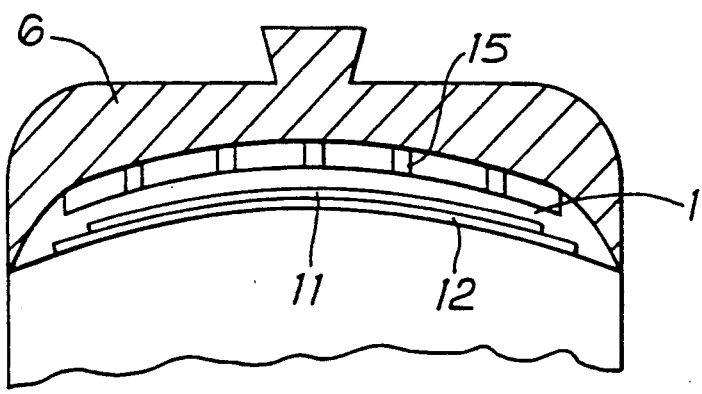
FIG. 2 is a cross-section through a tread package in a pattern ring.
Figure 2A:
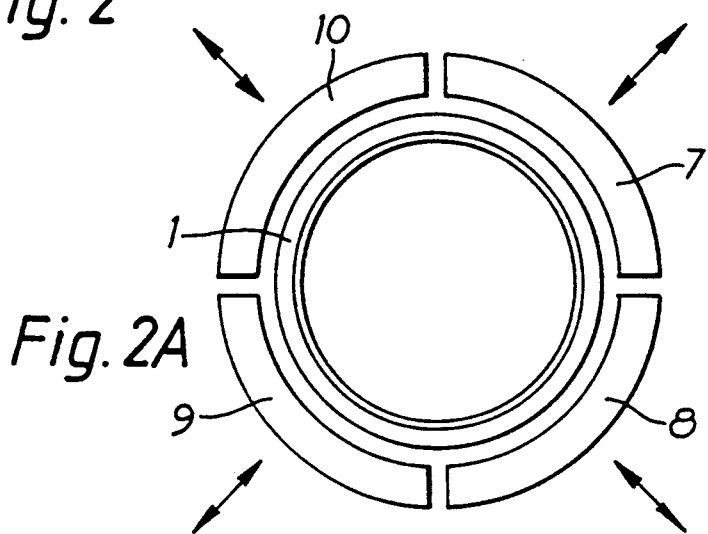
FIG. 2a is a diagrammatic side view of the tread package and the pattern ring.

In the method of the first embodiment the tread package is assembled by positioning the two filler strips 13, 14, the two breaker layers 11, 12, the under-tread rubber and the tread rubber in turn around a cylindrical mandrel. A pattern ring 6 (see FIG. 1 and 2a) comprising a plurality of segments 7, 8, 9, 10 (in this embodiment four) is expanded by moving the segments radially outward and then closed in a controlled manner around the tread package on the mandrel. The segments are provided with ribs 15 and/or other projections etc. so as to impart the required pattern to the tread rubber.

The ring is then heated to a predetermined temperature for a predetermined length of time, e.g. by steam or an electric current, so as to cause the rubber of the tread package to become partially cured. However a veneer of rubber on the radially inner surface of the radially inner breaker layer is deliberately left uncured, or only slightly cured. This assists the adhesion of the tread package to the carcass during a subsequent state in the tire manufacture. The mandrel is then collapsed radially inwards leaving the tread package located in the closed pattern ring.

The pattern ring 6 and the tread package 1 located therein are then positioned accurately around a conventional tire building former on which a tire carcass comprising a carcass ply 3 and beads including bead cores 4, 5, has been assembled in a conventional manner in a cylindrical shape. The former is then expanded to cause the carcass to be shaped to toroidal form and the crown of the carcass to be pressed into contact with the radially inner surface of the tread package 1, and in particular with the uncured, or only slightly cured, veneer on the radially inner breaker ply 12.

The tire sidewalls 2, 21, i.e. layers of rubber to protect the carcass ply 3 in use of the tire, may be applied to the carcass when it is in either the cylindrical or toroidal shape.

Figure 4:
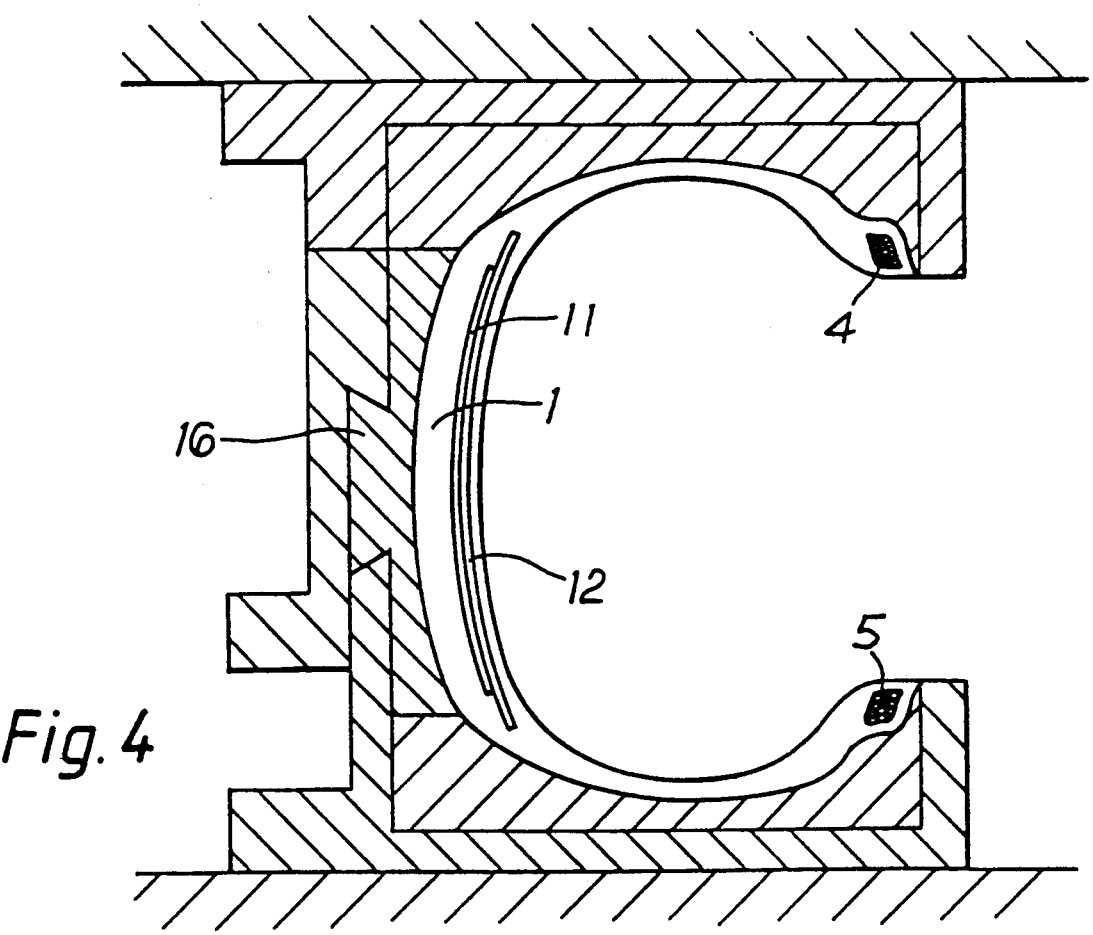
FIG. 4 is a cross-section through the complete tire in a mould.

The pattern ring 6 is then separated from the tread rubber by expanding the segments 7, 8, 9 and 10 radially outward, the former collapsed, and the completed green cover, but comprising a partially cured tread package, placed in a mould 16 as shown in Fig. 4. This mould is devoid of any means, e.g. ribs or other projections, to impart a pattern to the thread rubber, and may or may not shape the sidewalls, depending on whether the sidewalls were pre-shaped before being applied to the carcass.

The mould, in a press, is then heated in conventional manner to complete the cure of the tire.

Figure 3:
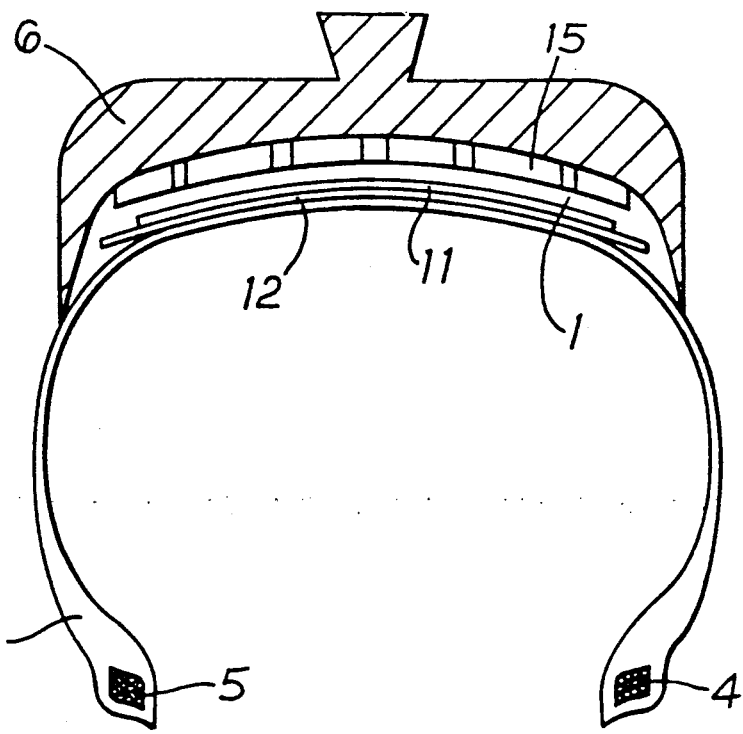
FIG. 3 is a cross-section through the tread package and the carcass in the pattern ring.

In the method of the second embodiment the tread package is assembled in the pattern ring 6, and the remaining parts of the tire assembled and shaped within the tread package as described in the method of the first embodiment, but the tread package is not heated and therefore not cured at all until it is in contact with the carcass 3 as shown in FIG. 3. However, by limiting the temperature of the pattern ring and the length of time for which it is heated only the tread package and no other part of the tire becomes partially cured.

It is an advantage of the second embodiment that since the radially outer surface of the carcass is brought into contact with the radially inner surface of the tread package adhesion is ensured.

Both embodiments of the invention allow relatively high pressure to be used during curing of the tread package, thus ensuring good homogeniety. Additionally it is believed that this improves the tread life of the finally cured tire in use.

Furthermore by imparting a pattern to the tread alone, and then partially curing it, more consistency is shape is obtained from one tire to the next compared with conventional methods.

Since in both embodiments of the invention the time for the pattern ring to impart a pattern to the tread ring is much shorter than the time taken for a complete tire to be moulded and cured in a conventional mould the overall cost can be reduced. Furthermore since the mould is devoid of means to impart a pattern to the tread rubber by use of suitable inserts the same mould may be used to cure tires of different tread widths with a corresponding reduction in expenditure.

Although the mould used in the method of the present invention is devoid of pattern-imparting means it may have one or more radially inward projections which, by locating in the pre-formed tread pattern, serve to locate the green cover accurately in the mould.

A principal advantage of the method according to the present invention is that cure time in the final mould is substantially reduced.

We claim:

1. A method of manufacturing a tire comprising the steps of:
   a) assembling an annular tread package which includes at least one breaker layer and uncured tread rubber into a pattern ring to impart a pattern on the tread rubber;
   b) heating the pattern ring so as to partially pre-cure the imparted tread formation whilst partially pre-curing the tread package as a whole;
   c) retaining said tread package in said pattern ring whilst positioning an uncured carcass of the tire within said tread package in such a manner that a radially outer surface of said carcass contacts uncured radially inner portions of said tread package thereby assembling a complete tire;
   d) separating the pattern ring from the tread rubber after said complete tire has been assembled;
   e) placing the assembled tire within a mold devoid of means to impart a tread pattern to the tire; and
   f) heating the mold completely to effect bonding between said radially outer carcass surface and said radially inner tread package portions, and to cure the entire assembled tire completely.

2. A method as claimed in claim 1, wherein the tread package is assembled on a mandrel before being assembled into the pattern ring.

3. A method as claimed in claim 1, wherein a veneer of rubber on the radially inner side of the package is partially or wholly uncured.

4. A method as claimed in claim 1, wherein the pattern ring comprises a plurality of radially movable segments which are moved radially outwards in a controlled manner to separate the pattern ring from the tread rubber.

5. A method as claimed in claim 1, wherein the carcass is positioned within the tread package before the pattern ring is heated.

6. A method as claimed in claim 1, wherein the carcass is positioned within the tread package after the pattern ring is heated.

7. A method as claimed in claim 1, wherein said heating of said pattern ring occurs simultaneously with said positioning of said uncured carcass.

8. A method as claimed in claim 1, wherein the tread package is urged under relatively high pressure toward said pattern ring during formation of the tread and partial curing of said package.

9. A method as claimed in claim 1, wherein the mold is adapted to receive interchangeable inserts corresponding to the size of tire to be cured therein.

10. A method as claimed in claim 1, wherein the mold is provided with one or more radially inwards projections which locate with pre-formed tread patterns of the complete tire assembly.

* * * * *